UNITED STATES PATENT OFFICE.

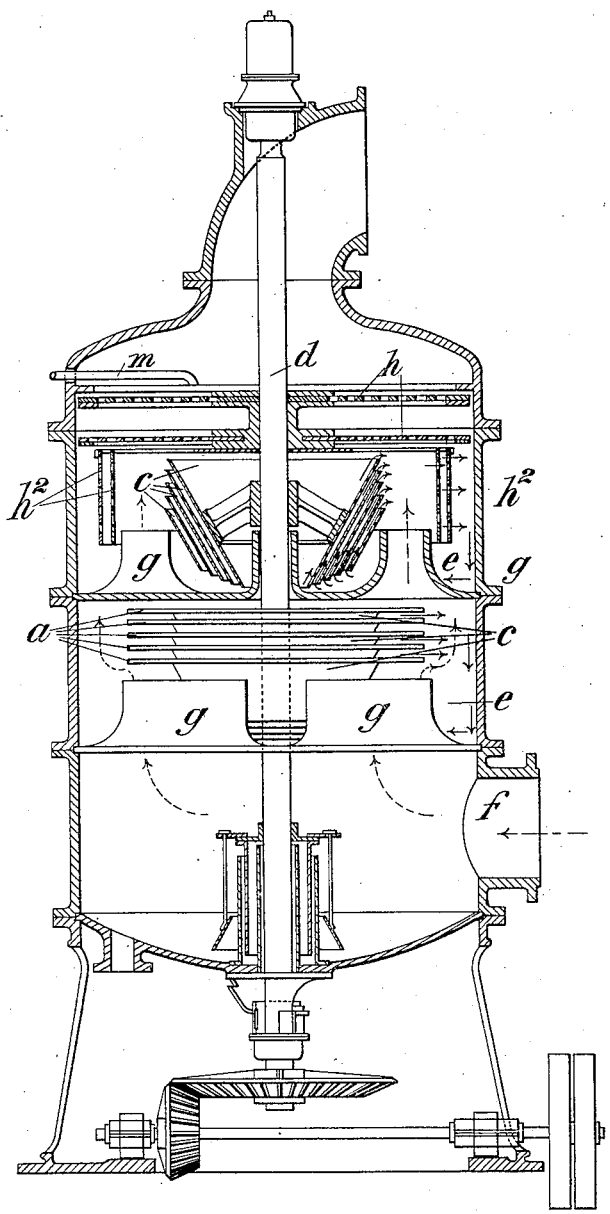

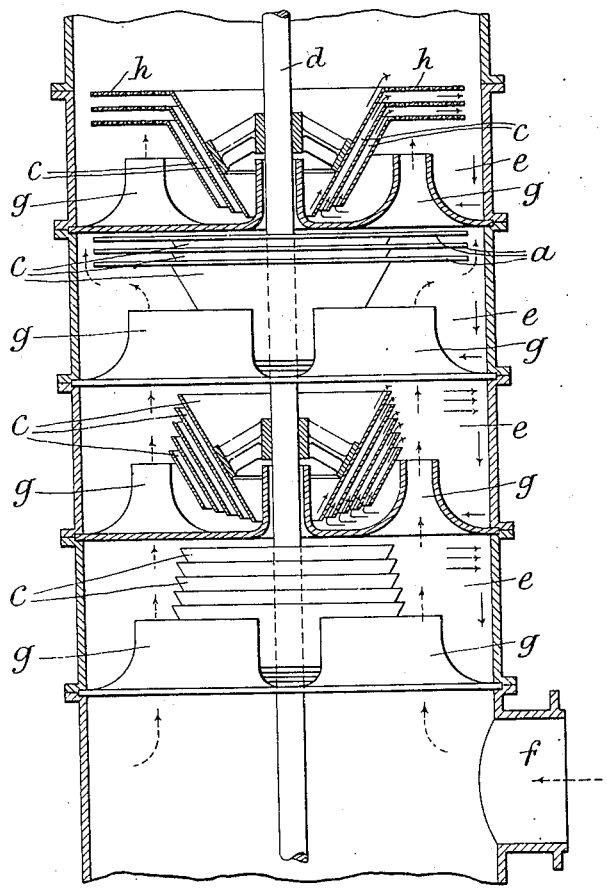
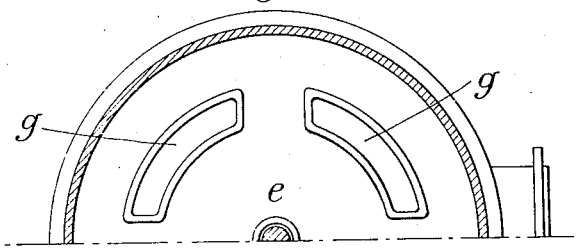

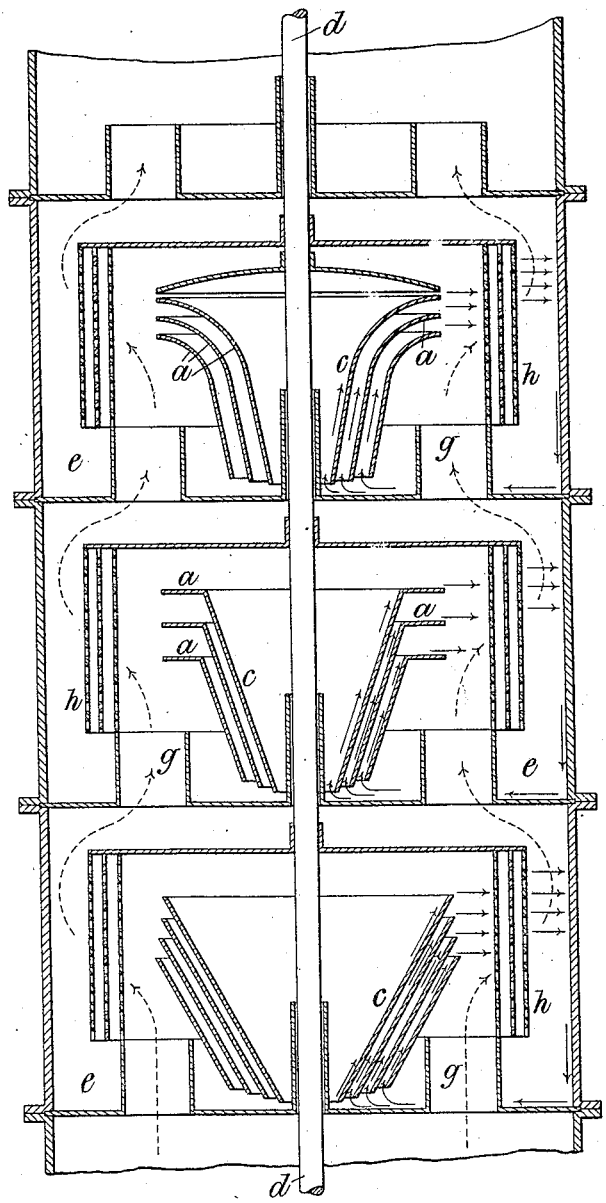

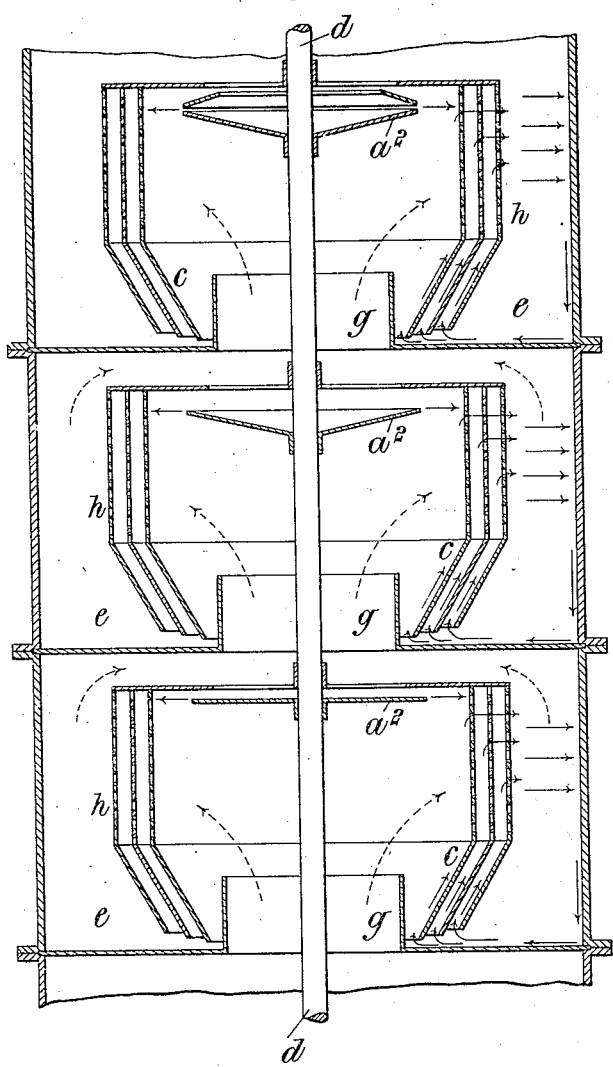

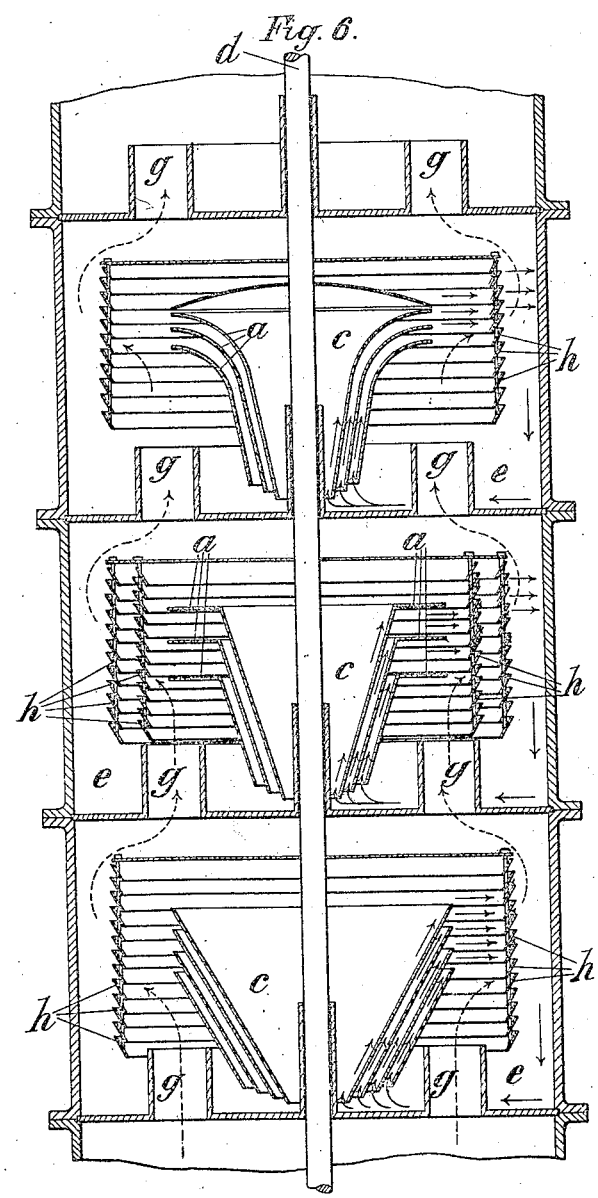

WALTHER FELD, OF HONNINGEN-ON-THE-RHINE, GERMANY.

GAS-WASHER.

940,103.  Specification of Letters Patent.  Patented Nov. 16, 1909.

Application filed August 31, 1909.  Serial No. 515,507.

*To all whom it may concern:*

Be it known that I, WALTHER FELD, a subject of the King of Prussia and the German Emperor, of Honningen-on-the-Rhine, in the Kingdom of Prussia and German Empire, have invented new and useful Improvements in Gas-Washers, of which the following is a specification.

This invention has for its object to provide an improved gas washer of the general character described in my U. S. Patent No. 829,261, granted August 21, 1906.

The apparatus, according to the present invention, consists of, or comprises, a vessel, or vessels, for the liquid, in the bottom of which vessel, or of each of which vessels, are openings for the passage of the gas, or vapor, and in the said vessel, or each of the said vessels, is a rotatable device analogous to that of the said former patent, consisting of concentric funnels, or pipes, with, or without, superposed plates, the said funnels or pipes, dipping into the liquid in the vessel, and the said device extending above the said liquid, so that, on rotation, the funnels, or pipes, will, under centrifugal action, take up the liquid between them, and the device will distribute it in the form of spray across the whole of the space through which the gases, or vapors, pass, so that the gases, or vapors, pass through sprayed liquid. The sprayed liquid returns into the vessel, or vessels, so that it circulates in the apparatus and a rotatable screen, with a number of passages through it, formed, for example, of perforated metal plate, or a number of strips, or slats, or of wire-work, or two, or more, such screens is, or are, provided above, or around, or both above and around, the device, or each device, or the topmost of the devices, for the purposes of separating moisture which the gases, or vapors, may have taken up from the sprayed liquid.

In order that this invention, and how it may be performed, may be well understood, I will describe, with reference to the accompanying drawings, constructions in accordance therewith.

Figure 1 is a vertical section of a construction of the apparatus, Fig. 2 is a vertical section of the mid part of a modification, Fig. 3 is a half cross-section of one of the vessels showing the gas passages, and Figs. 4, 5 and 6 are vertical diagrammatic sections illustrating modifications as hereinafter described.

Referring first to the construction shown in Fig. 1, the apparatus consists of vessels $e$, one above the other, each for holding the liquid. The bottoms of the said vessels $e$ are provided with gas-passages $g$, which passages $g$ also serve as overflows for the liquid, although special overflows may be provided if desirable. Passing down the center of the apparatus is a rotatable shaft $d$ which may be driven in any suitable way, such as by gearing as shown. Secured to this shaft are concentric funnels, or pipes, $c$, which may each carry at top an annular plate $a$, as shown in the lower vessel, or be without such plate, as shown in the upper vessel. The said funnels, or pipes, $c$ at their lower ends dip into the liquid in the vessels $e$, and are arranged concentrically, so that there are spaces between them for the passage of liquid up between the said funnels, or pipes, $c$ and onto, and off from, the said annular plates $a$ (when such plates are used), the said passage of liquid being induced by centrifugal action due to the motion of rotation given to the said funnels, or pipes, $c$, and annular plates $a$ (when such plates are used) when the shaft $d$ is rotated, the liquid being under such centrifugal action, thrown off from the said upper ends of the funnels, or pipes, $c$, or from the annular plates $a$, so as to form a fine spray of the said liquid throughout the cross-sectional area of the space between the upper edges of the said funnels, or pipes, $c$, or the outer edges of the plates $a$, and the interior of the vessels $e$. The gases, or vapors, enter from below at $f$ and pass up, through the gas passages $g$, and up through the aforesaid spaces in which the liquid is sprayed, as aforesaid, where the said gases, or vapors, are very thoroughly subjected to the action of the sprayed liquid, passing, as they do, through sprayed liquid only. After the said gases, or vapors, pass from the uppermost division of the apparatus, they pass through a perforated, or reticulated, rotating screen, or screens, $h$ (two horizontal screens are shown in Fig. 1) which is, or are, arranged horizontally (or, if preferred, conically) inside the upper part of the apparatus so that the gases, or vapors, are compelled to pass through the said screen, or screens, $h$, and thence to the outlet, the said screen, or screens, $h$ separating any liquid which may be carried up with the gases, or vapors. The screen, or screens, $h$ is, or are, secured to the shaft $d$. The liquid can be admitted to the upper vessel through any suitable inlet (such as that shown at $m$, for example, which may lead the liquor upon the middle of the uppermost screen $h$) and pass off through an outlet at the lower part of the apparatus. I have also shown a vertical screen $h^2$ in Fig. 1, this being carried by arms secured to the shaft. It may be used, or not.

The construction of the apparatus shown in Fig. 2 is generally like that shown in Fig. 1, and corresponding parts are marked with the same letters of reference, but I have shown in Fig. 2 a larger number of vessels, and I have shown in the two upper vessels the rotating horizontal (or conical) perforated, or reticulated, screens as being carried by the funnels $c$, at top thereof, which combines the action of the plate $a$ with the screen $h$.

In Fig. 4 a vertical rotating perforated, or reticulated, screen, or screens, $h$, is, or are, used, arranged concentrically to the funnels, or pipes, $c$, the said screen, or screens, being carried by a top plate secured to the shaft $d$. The gases, or vapors, are compelled to pass, with the sprayed liquor, through the space between the funnels and screen, or screens, and thence through the screen, or screens. In the lower vessel $e$ simple funnels, or pipes, are shown, in the middle vessel they have plates $a$ on them, and in the upper vessel the spraying device is a combination of conical funnels, or pipes, $c$ curving into annular plates $a$. The screens $h$ may consist of one perforated, or reticulated, sheet, or of two, or more, such sheets, and the perforations, or reticulations, may be arranged so that those in one sheet are out of line with those in the other, or others, so as to compel the gases, or vapors, and liquid to repeatedly change their course when passing through the screens.

Fig. 5 shows a modification of the apparatus in which the pipes, or funnels, $c$ are combined with vertical rotating perforated, or reticulated, screens $h$, secured, by top plates and arms, to the shaft $d$, the liquid being induced, by centrifugal action, to pass up between the said pipes, or funnels, and onto, and off from, the screens, so that it is forced through the screens together with the gas, or vapor. The gas passages $g$ are arranged in the middle of the vessel, or vessels, $e$ and serve also as overflows for the liquid. The top plates, by which the vertical screens are secured to the arms connected with the shaft $d$, have openings at their middle around the shaft and a short distance beneath each such opening is a plate $a^2$ which may be of any suitable shape, such as horizontal, as in the lower vessel, conical, as in the middle vessel, or consist of two oppositely placed conical plates with a space between their edges, as in the upper vessel. These plates are secured to the shaft $d$. The liquid, overflowing from the vessel above, falls upon these plates $a^2$ and is, by centrifugal action, thrown off from their peripheries so as to form a fine spray throughout the cross-sectional area of the space between the edges of the said plates $a^2$ and the perforated, or reticulated, vertical screen.

Fig. 6 shows a modification like that shown in Fig. 4, except that the rotatable screens $h$ are made of a number of circular inclined slats secured together and to a top plate fixed to the shaft $d$, and arranged after the manner of louvres, so that the liquid is given, by these slats, further centrifugal impulse and is again sprayed off from the upper edges of the said slats. There may be, if desired, two, or more, of these arrangements of slats so that the liquid passes from one to the other.

In all the figures the course of the gases is shown by dotted line arrows and the course of the liquid is shown by solid line arrows.

Instead of the gases, or vapors, being passed upward through the apparatus, they may be passed downward therethrough, in which case the inlet for the gases, or vapors, will be at the upper part of the apparatus, and the outlet for the gases, or vapors, will be at the lower part of the apparatus, and a rotating screen, or screens, of either of the characters shown, will be placed inside the lower vessel $e$.

The apparatus enables a constant circulation of the liquid to be maintained. Surplus liquid which may be run in at the top of the apparatus, or which may condense from the gases, or vapors, can leave, or be drawn from, the apparatus by a sealed outlet, or valve, at bottom.

There may be any suitable number of the vessels spraying devices and screens, as described, and the apparatus can be conveniently made up of sections, each carrying such an arrangement, and superposed and luted together, as illustrated. The vessel, or vessels, may be of any suitable form, for example they may be conical if desired.

I claim:—

1. In a gas washer a vessel adapted to contain the washing fluid, a rotatable shaft passing vertically therethrough, centrifugal members carried thereby and dipping their lower ends into said liquid and formed to spray the latter by centrifugal action upon the rotation of the shaft, together with a screen rotating with said shaft, in combination with a gas inlet and a gas outlet arranged to direct the gas from the inlet through the sprayed liquid and screens to the outlet, substantially as described.

2. In a gas washer a vessel adapted to contain the washing fluid, a rotatable shaft passing vertically therethrough, centrifugal members carried thereby and dipping their lower ends into said liquid and formed to spray the latter by centrifugal action upon the rotation of the shaft, together with a vertical screen rotating with said shaft, in combination with a gas inlet and a gas outlet arranged to direct the gas from the inlet through the sprayed liquid and screens to the outlet, substantially as described.

3. In a gas washer a vessel adapted to contain the washing fluid, a rotatable shaft passing vertically therethrough, centrifugal members carried thereby and dipping their lower ends into said liquid and formed to spray the latter by centrifugal action upon the rotation of the shaft, together with a vertical screen concentric with the centrifugal members and rotating with said shaft, in combination with a gas inlet and a gas outlet arranged to direct the gas from the inlet through the sprayed liquid and screens to the outlet, substantially as described.

4. In a gas washer, a vessel adapted to contain the washing fluid, a rotatable shaft passing vertically therethrough, centrifugal members carried thereby and dipping their lower ends into said liquid and formed to spray the latter by centrifugal action upon the rotation of the shaft, together with a screen rotating with said centrifugal members and arranged to supplement the centrifugal action of the latter, in combination with a gas inlet and a gas outlet arranged to direct the gas from the inlet through the sprayed liquid and screens to the outlet, substantially as described.

5. In a gas washer, a vessel adapted to contain the washing fluid, a rotatable shaft passing vertically therethrough, centrifugal members carried thereby and dipping their lower ends into said liquid and formed to spray the latter by centrifugal action upon the rotation of the shaft, together with a plurality of concentric vertical screens arranged outside said centrifugal members and rotating therewith, in combination with a gas inlet and a gas outlet arranged to direct the gas from the inlet through the sprayed liquid and screens to the outlet, substantially as described.

In testimony whereof I have signed my name to this specification in the presence of two subscribing witnesses.

WALTHER FELD.

Witnesses:
  WOLDEMAR HAUPT,
  HENRY HASPER.